United States Patent
Singla et al.

(10) Patent No.: US 12,417,021 B2
(45) Date of Patent: Sep. 16, 2025

(54) MANAGING STREAMS BASED ON PREDICTED HOST COMMANDS

(71) Applicant: Sandisk Technologies, Inc., Milpitas, CA (US)

(72) Inventors: Lovish Singla, Bangalore (IN); Shaheed Nehal A, Bangalore (IN); Prathmesh Tandon, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 44 days.

(21) Appl. No.: 18/473,500

(22) Filed: Sep. 25, 2023

(65) Prior Publication Data
US 2025/0103205 A1    Mar. 27, 2025

(51) Int. Cl.
*G06F 3/06*     (2006.01)
*G06F 12/0862*   (2016.01)

(52) U.S. Cl.
CPC ............ *G06F 3/061* (2013.01); *G06F 3/0659* (2013.01); *G06F 3/0679* (2013.01); *G06F 12/0862* (2013.01); *G06F 2212/6022* (2013.01); *G06F 2212/6028* (2013.01)

(58) Field of Classification Search
CPC ...... G06F 3/061; G06F 3/0659; G06F 3/0679; G06F 12/0862; G06F 2212/6022; G06F 2212/6028
See application file for complete search history.

(56) References Cited

U.S. PATENT DOCUMENTS

| 11,513,720 | B1 | 11/2022 | A et al. | |
| 2014/0052927 | A1* | 2/2014 | McCauley | G06F 12/0862 |
| | | | | 711/137 |
| 2022/0155995 | A1* | 5/2022 | Jung | G06F 3/0679 |

* cited by examiner

*Primary Examiner* — Tim T Vo
*Assistant Examiner* — Janice M. Girouard
(74) *Attorney, Agent, or Firm* — DENTONS Durham Jones Pinegar

(57) ABSTRACT

A controller of a data storage device manages access to sequential streams based on predicted commands from a host device. When a command is received, the controller analyzes command characteristics associated with the command. The controller also analyzes command characteristics associated with each predicted command. The controller compares the command characteristics to determine whether any of the predicted commands are sequential to the received command. If the controller determines that one or more of the predicted commands are sequential to the received command, the controller enables data associated with the received command to be written to a sequential stream. The controller also updates a stream counter associated with the sequential stream. The stream counter is used to determine which sequential stream will be closed and subsequently opened when a new set of sequential commands is received or identified.

20 Claims, 8 Drawing Sheets

| RECEIVED COMMAND | START LBA | COMMAND LENGTH | STREAM | STREAM COUNTER |
|---|---|---|---|---|
| COMMAND 1 | 0x20000 | 0x4000 | STREAM 0 | STREAM 0 COUNTER = 0x14000<br>STREAM 1 COUNTER = 0x0 |
| *COMMAND 2* | 0x0 | 0x2000 | -- | -- |
| <u>COMMAND 3</u> | 0x50000 | 0x4000 | -- | -- |
| COMMAND 4 | 0x24000 | 0x4000 | -- | -- |
| *COMMAND 5* | 0x2000 | 0x2000 | -- | -- |
| <u>COMMAND 6</u> | 0x54000 | 0x4000 | -- | -- |
| COMMAND 7 | 0x28000 | 0x4000 | -- | -- |
| *COMMAND 8* | 0x4000 | 0x2000 | -- | -- |
| COMMAND 9 | 0x2C000 | 0x4000 | -- | -- |
| COMMAND 10 | 0x30000 | 0x4000 | -- | -- |
| COMMAND 11 | 0x34000 | 0x4000 | -- | -- |

FIG. 2

| RECEIVED COMMAND | START LBA | COMMAND LENGTH | STREAM | STREAM COUNTER |
|---|---|---|---|---|
| COMMAND 1 | 0x20000 | 0x4000 | STREAM 0 | STREAM 0 COUNTER = 0x14000<br>STREAM 1 COUNTER = 0x0 |
| *COMMAND 2* | 0x0 | 0x2000 | STREAM 1 | STREAM 0 COUNTER = 0x14000<br>STREAM 1 COUNTER = 0x4000 |
| <u>COMMAND 3</u> | 0x50000 | 0x4000 | -- | -- |
| COMMAND 4 | 0x24000 | 0x4000 | -- | -- |
| *COMMAND 5* | 0x2000 | 0x2000 | -- | -- |
| <u>COMMAND 6</u> | 0x54000 | 0x4000 | -- | -- |
| COMMAND 7 | 0x28000 | 0x4000 | -- | -- |
| *COMMAND 8* | 0x4000 | 0x2000 | -- | -- |
| COMMAND 9 | 0x2C000 | 0x4000 | -- | -- |
| COMMAND 10 | 0x30000 | 0x4000 | -- | -- |
| COMMAND 11 | 0x34000 | 0x4000 | -- | -- |

FIG. 3

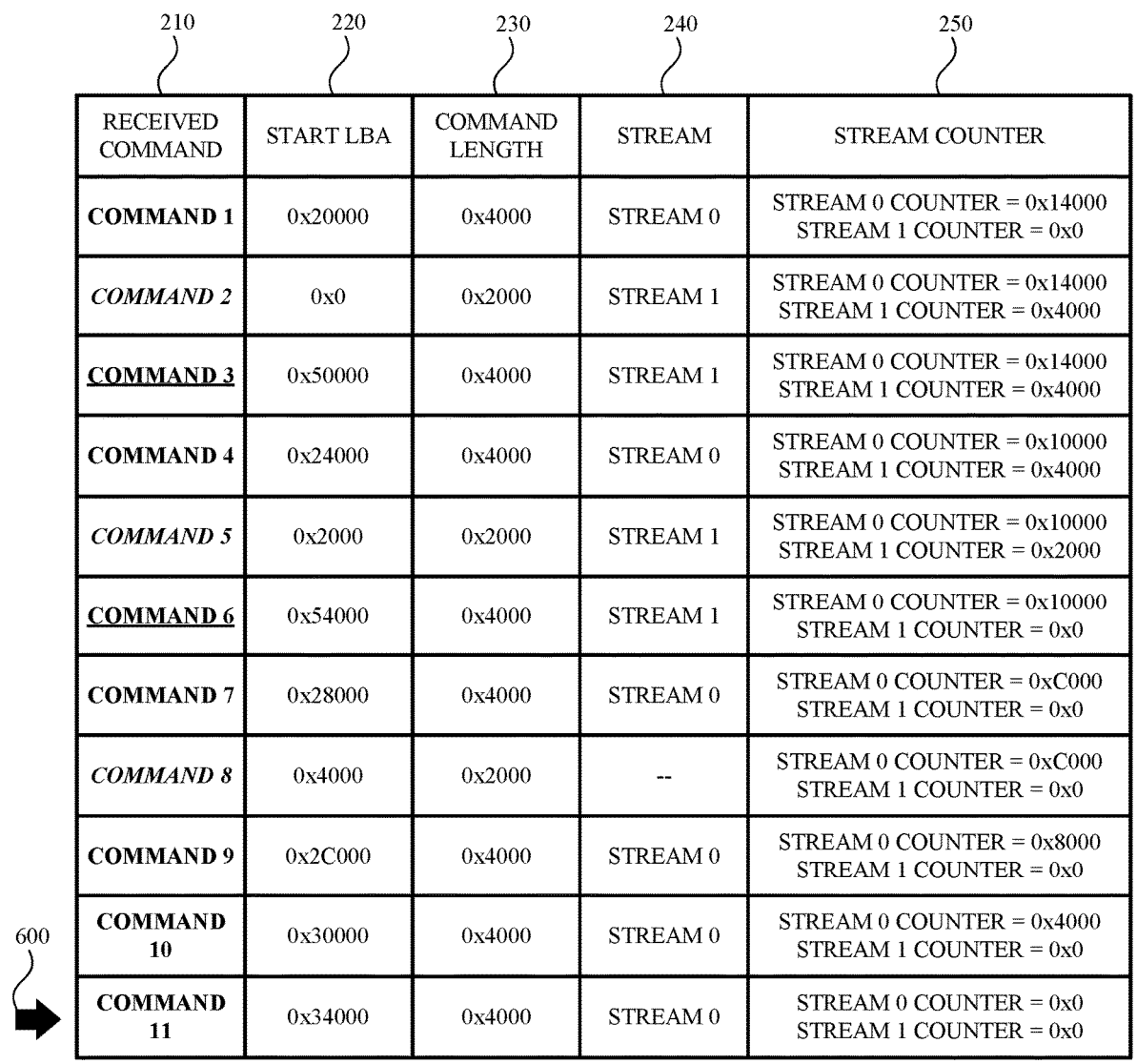

| RECEIVED COMMAND | START LBA | COMMAND LENGTH | STREAM | STREAM COUNTER |
|---|---|---|---|---|
| COMMAND 1 | 0x20000 | 0x4000 | STREAM 0 | STREAM 0 COUNTER = 0x14000<br>STREAM 1 COUNTER = 0x0 |
| *COMMAND 2* | 0x0 | 0x2000 | STREAM 1 | STREAM 0 COUNTER = 0x14000<br>STREAM 1 COUNTER = 0x4000 |
| <u>COMMAND 3</u> | 0x50000 | 0x4000 | STREAM 1 | STREAM 0 COUNTER = 0x14000<br>STREAM 1 COUNTER = 0x4000 |
| COMMAND 4 | 0x24000 | 0x4000 | STREAM 0 | STREAM 0 COUNTER = 0x10000<br>STREAM 1 COUNTER = 0x4000 |
| *COMMAND 5* | 0x2000 | 0x2000 | STREAM 1 | STREAM 0 COUNTER = 0x10000<br>STREAM 1 COUNTER = 0x2000 |
| <u>COMMAND 6</u> | 0x54000 | 0x4000 | STREAM 1 | STREAM 0 COUNTER = 0x10000<br>STREAM 1 COUNTER = 0x0 |
| COMMAND 7 | 0x28000 | 0x4000 | STREAM 0 | STREAM 0 COUNTER = 0xC000<br>STREAM 1 COUNTER = 0x0 |
| *COMMAND 8* | 0x4000 | 0x2000 | -- | STREAM 0 COUNTER = 0xC000<br>STREAM 1 COUNTER = 0x0 |
| COMMAND 9 | 0x2C000 | 0x4000 | STREAM 0 | STREAM 0 COUNTER = 0x8000<br>STREAM 1 COUNTER = 0x0 |
| COMMAND 10 | 0x30000 | 0x4000 | STREAM 0 | STREAM 0 COUNTER = 0x4000<br>STREAM 1 COUNTER = 0x0 |
| COMMAND 11 | 0x34000 | 0x4000 | STREAM 0 | STREAM 0 COUNTER = 0x0<br>STREAM 1 COUNTER = 0x0 |

FIG. 6

MANAGING STREAMS BASED ON PREDICTED HOST COMMANDS

BACKGROUND

A multi-stream data storage device is a data storage device for which a host device creates and/or opens one or more streams in the data storage device. When the streams are open, the host sends various commands, such as write commands, and associated data to the data storage device via a particular stream. As the data is received by the data storage device, the data storage device writes the received data to physically related memory blocks.

However, in some examples, the number of available streams is limited. Additionally, the commands that are issued by the host device are open ended. As such, a controller and/or firmware associated with the data storage device is unaware of the amount of data associated with the command and is unable to determine whether the data associated with the command is sequential data or random data.

Thus, as various commands are issued and executed, streams are typically opened and closed as data is received. For example, if the controller determines that data associated with a received command should be written sequentially but a stream is not available, the controller closes one stream, subsequently opens the stream, and associates the stream with the received command. In current solutions, the stream that is selected to be closed and subsequently opened, is a stream that was the least recently used. However, this solution causes sequential data to be mixed across various streams and across multiple memory blocks, which causes a drop in performance of the data storage device.

Accordingly, it would be beneficial to improve the management of streams of a data storage device, thereby improving the overall performance of the data storage device.

SUMMARY

The present disclosure describes routing data to a data storage device and managing sequential streams associated with the data storage device. In an example, the data is routed to the data storage device and the sequential streams are managed based, at least in part, on a set of predicted commands that are associated with a host device. For example, the data storage device receives one or more commands from the host device. A controller associated with the data storage device analyzes the one or more commands and determines one or more command characteristics associated with the one or more commands. The controller predicts a set of commands, or receives a set of predicted commands, that will be issued by the host device. When the predicted commands are determined and/or received, the controller analyzes one or more command characteristics associated with the predicted commands.

The controller then determines, based at least in part, on the command characteristics associated with the one or more received commands and on the command characteristics associated with the set of predicted commands, whether to sequentially write the data (e.g., via a sequential stream) that is associated with the one or more commands that were received or whether to write the data associated with the one or more commands to random memory blocks.

In examples in which the number of sequential streams associated with the data storage device is limited, the controller will also determine, based on the various command characteristics, which sequential streams to open and/or close. For example, as various commands are received and/or are predicted, and as sequential data is identified, the controller tracks an amount of sequential data (or a length of the sequential data) associated with the various commands. The controller opens and closes the various sequential streams based, at least in part, on the amount of sequential data that is yet to be written.

Accordingly, examples of the present disclosure describe a method that includes receiving a command from a host device and determining one or more command characteristics associated with the received command. A set of upcoming commands from the host device is predicted. A determination is made based, at least in part, on one or more command characteristics associated with the set of upcoming commands and on the one or more command characteristics associated with the received command, whether one or more commands of the set of upcoming commands is sequential to the received command. Based, at least in part, on determining the one or more commands of the set of upcoming commands is sequential to the received command, a sequential stream is associated with the received command and a counter for the sequential stream is determined. In an example, the counter indicates an amount of data associated with the one or more commands of the set of upcoming commands that is sequential to the received command.

In another example, the present disclosure describes a data storage device that includes a controller and a memory communicatively coupled to the controller. The memory stores instructions that, when executed by the controller, perform operations. In an example, the operations include receiving a command from a host device and determining one or more command characteristics associated with the received command. A set of predicted commands from the host device is also analyzed. A determination is made as to whether one or more commands of the set of predicted commands is sequential to the received command. In an example, the determination is based, at least in part, on one or more command characteristics associated with the set of predicted commands and on the one or more command characteristics associated with the received command. When it is determined that the one or more commands of the set of predicted commands is sequential to the received command, a first counter associated with a first sequential stream is compared to a second counter associated with a second sequential stream. In an example, the first counter indicates an amount of data associated with a first set of predicted sequential commands and the second counter indicates an amount of data associated with a second set of predicted sequential commands. The received command is then associated with one of the first sequential stream or the second sequential stream based, at least in part, on the comparison.

In yet another example, the present disclosure describes a data storage device. In an example, the data storage device includes means for receiving a command from a host device. The data storage device also includes means for determining one or more command characteristics associated with the received command and means for analyzing a set of predicted commands from the host device. The data storage device also includes means for determining whether one or more commands of the set of predicted commands is sequential to the received command and means for comparing a first counter associated with a first sequential stream to a second counter associated with a second sequential stream. The first counter indicates an amount of data associated with a first set of predicted sequential commands and the second counter indicates an amount of data associated with a second set of predicted sequential commands. In an example, the comparison is based, at least in part, on a determination that the one or more commands of the set of predicted commands is sequential to the received command. The data storage device also includes means for associating the received command with one of the first sequential stream or the second sequential stream. In an example, the received command is associated with one of the first sequential stream or the second sequential stream based, at least in part, on the comparison.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2 illustrates how a controller of a data storage device assigns a received command to a sequential stream based, at least in part, on a set of predicted commands according to an example.

FIG. 3 illustrates an example in which the controller assigns a received command to a sequential stream and updates a stream counter associated with the sequential stream when a new command is received according to an example.

FIG. 6 illustrates how the controller continues to assign various commands to various sequential streams and how stream counters associated with the various sequential streams are updated according to an example.

DETAILED DESCRIPTION

Figure 1:
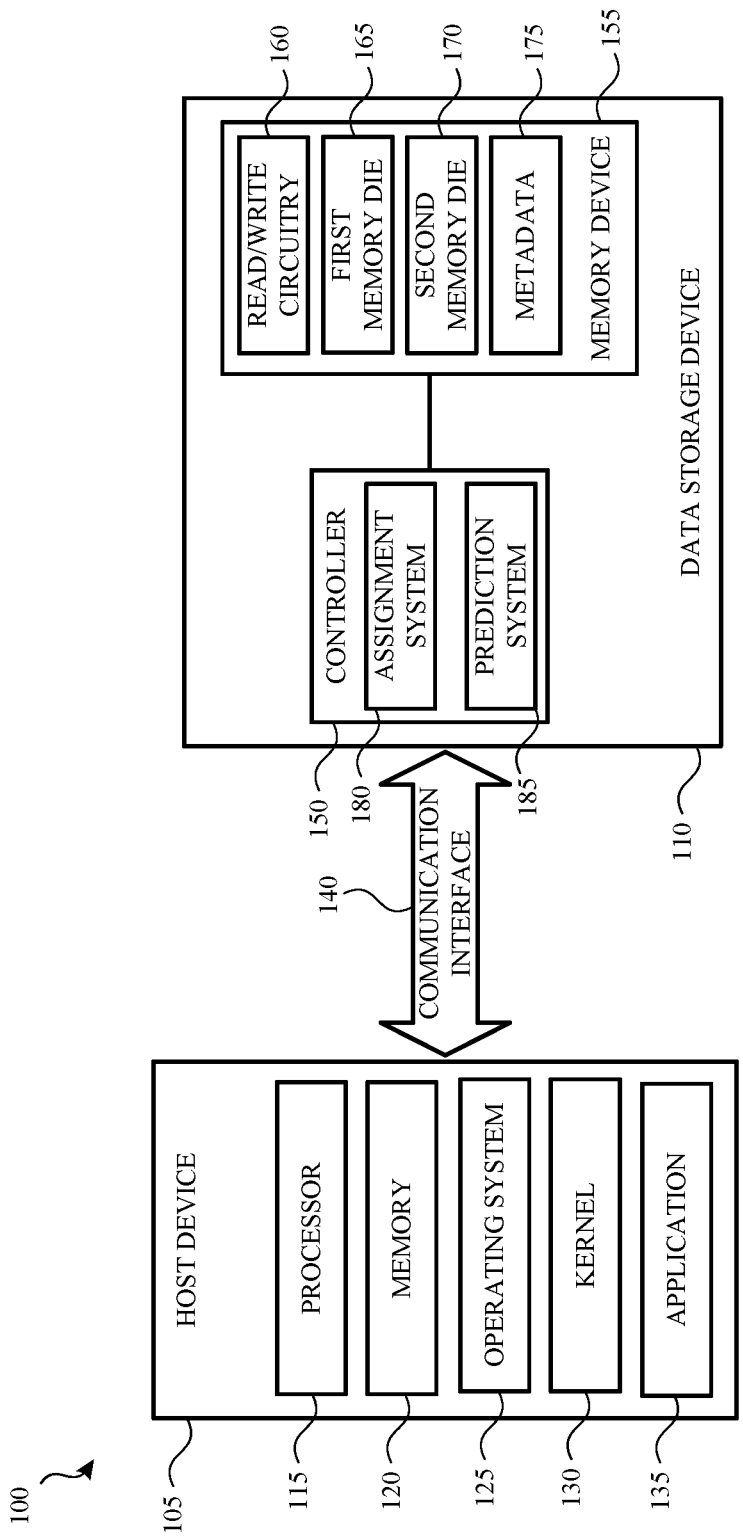
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Data storage devices, such as flash memory devices, solid-state drives (SSDs) and other memory devices, continue to evolve in terms of capacity and memory configurations. However, as data storage devices evolve, so do the computing devices that utilize the data storage devices. For example, as the computing devices evolve, the computing devices issue commands with bigger and bigger chunks of random data and/or sequential data.

However, in some examples, the commands that are issued by the computing device are open ended. As such, the controller and/or firmware associated with the data storage device is unaware of the transfer length (e.g., the amount of data) associated with the command. The controller and/or the firmware associated with the data storage device is also unable to determine whether the data associated with the command is sequential data or random data.

In current solutions, when data associated with a command is received, a first threshold amount of data is written to a random stream. If additional data remains, the additional data, up to a second threshold amount of data, is written to an intermediate stream. If the second threshold amount of data is exceeded, the remaining amount of data is written to a sequential stream.

For example, if the received command is 8 megabytes (MB), the first 2 MB is written to the random stream, the next 2 MB is written to the intermediate stream, and the remaining 4 MB is written to the sequential stream. In examples in which an intermediate stream is not used, the remaining 6 MB is written to the sequential stream.

In some examples, the data storage device has a limited number of sequential streams. Thus, before a new sequential stream is opened, another sequential stream may need to be closed. In current solutions, the sequential stream that is closed is a sequential stream that was the least recently used. For example, if the data storage device has access to two sequential streams, data associated with a first received command is written to a first sequential stream and data associated with a second received command is written to a second sequential stream. When a third command is received, the first sequential stream is closed (because the first sequential stream is the least recently used) and data associated with the third command is written to the first sequential stream.

When a fourth command is received, the second sequential stream is closed (because the second sequential stream is now the least recently used) and data associated with the fourth command is subsequently written to the second sequential stream. However, in this example, data associated with the fourth command is sequential to the data associated with the first command. Although the data is sequential, the data is written in two different streams. Thus, using current solutions, sequential data is mixed across various streams and across multiple memory blocks which causes a drop in performance of the data storage device.

To address the above, the present application describes routing data to a data storage device and managing sequential streams associated with the data storage device based, at least in part, on command characteristics associated with a received command and on command characteristics associated with a set of predicted or upcoming commands.

For example, when the data storage device receives a command from a host device, a controller and/or firmware associated with the data storage device analyzes the received command and determines one or more command characteristics associated with the received command. The command characteristics include, but are not limited to, a starting logical block address (LBA) associated with the received command and an amount of data (e.g., a transfer length) associated with the received command.

When the command characteristics of the received command are determined, the controller predicts a set of commands and/or receives a set of predicted commands, that will be issued by the host device. When the predicted commands are determined and/or received, the controller analyzes one or more command characteristics (e.g., a start LBA and an amount of data) associated with each of the predicted commands. The controller then determines based, at least in part, on the command characteristics associated with the received command and on the command characteristics associated with each command in the set of predicted commands, whether the data associated any of the predicted commands is sequential to the data associated with the received command.

If it is determined that data associated with the predicted commands is sequential to the data associated with the received command, the controller associates the received command with a sequential stream and updates a counter associated with the sequential stream. In an example, the counter associated with the sequential stream indicates an amount of data associated with one or more commands of the set of upcoming commands that is sequential to the received command and has yet to be written. In an example, a counter is kept for each sequential stream associated with the data storage device.

When a new command is received, the controller determines, based on command characteristics associated with the new command, whether the new command is sequential to a previously received command and/or whether the sequential stream associated with the previously received command is still open and/or is still associated with the previously received command. If so, data associated with the new command is sequentially written to the sequential stream associated with the previously received command. If not, the controller determines which sequential stream should be closed based, at least in part, on the counter associated with each sequential stream.

Accordingly, many technical benefits may be realized including, but not limited to, reducing the mixing of sequential data and random data, thereby improving the overall performance of the data storage device. Additional benefits include reducing a frequency at which various garbage collection processes are executed. For example, when random data and sequential data is mixed, garbage collection processes occur more frequently as random data that is stored in single-level cell (SLC) memory blocks needs to be moved to multi-level cell (MLC) memory blocks. As the intermixing of data is reduced, the frequency at which garbage collection processes are executed is also reduced.

These benefits, along with other examples, will be shown and described in greater detail with respect to FIG. 1-FIG. 9.

FIG. 1 is a block diagram of a system 100 that includes a host device 105 and a data storage device 110 according to an example. The host device 105 includes a processor 115 and a memory 120 (e.g., a main memory). The memory 120 may include or otherwise be associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 includes a System on a Chip (SoC).

In an example, the memory 120 is used by the host device 105 to store data used, or otherwise executed by, the processor 115. Data stored in the memory 120 includes instructions provided by the data storage device 110 via a communication interface 140. The data stored in the memory 120 also includes data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 creates a virtual address space for the application 135 and/or other processes executed by the processor 115. The virtual address space may map to locations in the memory 120. The operating system 125 may also include or otherwise be associated with a kernel 130. The kernel 130 includes instructions for managing various resources of the host device 105 (e.g., memory allocation), handling read and write operations and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

In an example, the data storage device 110 includes a controller 150 and a memory device 155. The controller 150 may be communicatively coupled to the memory device 155. In an example, the memory device 155 includes one or more memory dies (e.g., a first memory die 165 and a second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In an example, the data storage device 110 is attached to or embedded within the host device 105. In another example, the data storage device 110 is an external device or a portable device that is communicatively or selectively coupled to the host device 105. In yet another example, the data storage device 110 is a component (e.g., a solid-state drive (SSD)) of a network accessible data storage system, a network-attached storage system, a cloud data storage system, and the like.

As previously explained, the memory device 155 of the data storage device 110 includes a first memory die 165 and a second memory die 170. Although two memory dies are shown, the memory device 155 may include any number of memory dies (e.g., one memory die, two memory dies, eight memory dies, or another number of memory dies).

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

Each of the first memory die 165 and the second memory die 170 may include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

The memory blocks are referred to herein as physical memory blocks because they relate to groups of physical memory cells. As used herein, a logical memory block is a virtual unit of address space defined to have the same size as a physical memory block. Each logical memory block includes a range of logical memory block addresses (LBAs) that are associated with data received from the host device 105. The LBAs are then mapped to one or more physical memory blocks in the data storage device 110 where the data is physically stored.

As previously described, the data storage device 110 also includes a controller 150. The controller 150 is communicatively coupled to the memory device 155 via a bus, an interface or other communication circuitry. In an example, the communication circuitry includes one or more channels to enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 also receives data and/or instructions/commands from the host device 105. The controller 150 may also cause data to be sent to the host device 105. For example, the controller 150 may send data to and/or receive data from the host device 105 via the communication interface 140. The controller 150 also sends data and/or commands to and/or receives data from, the memory device 155.

When the controller 150 receives data and/or commands, the controller 150 causes the commands to be executed on one or more of the memory dies in the memory device 155. For example, if the command is a write command, the controller 150 causes the memory device 155 to store data associated with the command at a specified physical address or memory block of the memory device 155. If the command is a read command, the controller 150 causes data to be read from the specified physical address of the memory device 155. The controller 150 may also execute various system commands and/or other background operations. These commands and/or operations include background scanning operations, garbage collection operations, and/or wear leveling operations.

In an example, the controller 150 includes, or is otherwise associated with, an assignment system 180 and a prediction system 185. The assignment system 180 is responsible for analyzing a command (e.g., a write command) received from the host device 105. The assignment system 180 analyzes the command to determine one or more command characteristics associated with the command. In an example, the command characteristics include a start LBA associated with the command and an amount of data (e.g., a command length or a transfer length) associated with the command. Although two command characteristics are specifically mentioned, other command characteristics may be used.

In an example, the data storage device 110 includes, or is associated with, at least one random stream and at least two sequential streams. Although one random stream and two sequential streams are mentioned, the data storage device 110 may include any number of random streams and/or sequential streams. The data storage device 110 may also include at least one intermediate stream.

In an example, when a command is received, the controller 150 determines whether an amount of data associated with the command exceeds a first threshold amount of data and a second threshold amount of data. In an example, the first threshold amount of data indicates that the data may be sequential data. However, a sequential stream may not be opened and/or provided to the command unless the second threshold is exceeded. In an example, the first threshold may be 2 MB. Although 2 MB is described, the first threshold may be any value.

The second threshold may indicate that the data associated with the command should be written to a sequential stream. In an example, the second threshold may also be 2 MB. Thus, if the command exceeds more than 4 MB, the controller 150 may determine that the data associated with the received command should be written to a sequential stream.

For example, when a command is received, a first amount of data is written to the random stream. If the first threshold amount of data is written to the random stream and there is still data to be written, a second amount of data is written to the intermediate stream. If the second threshold amount of data is written to the intermediate stream and there is still additional data to be written, the remaining data is written to one of the sequential streams.

However, as previously discussed, the number of sequential streams may be limited. As such, the controller 150 determines which sequential streams will be made available to various commands. As will be further explained herein, the determination is based, at least in part, on the command characteristics associated with the received command and on command characteristics associated with one or more predicted commands.

For example, when a command is received by the controller 150, the assignment system 180 analyzes the command characteristics associated with the command and determines the starting LBA of the received command and an amount of data (e.g., a command length) associated with the command. The assignment system 180 may also receive a set of predicted commands from the prediction system 185.

In an example, the prediction system 185 predicts upcoming commands that may and/or will be issued by the host device 105. In an example, the predicted commands are based, at least in part, on analyzing commands that were previously issued by the host device 105. In an example, the commands may be predicted using the various systems and methods disclosed and described in U.S. Pat. No. 11,513,720 entitled, "Data Storage Device Having Predictive Analytics", which is hereby incorporated by reference in its entirety. Although a specific predictive algorithm and processes are described, other predictive processes and/or systems may be used.

When the prediction system 185 has predicted N number of commands, the predicted commands are provided to the assignment system 180. The assignment system 180 analyzes one or more command characteristics associated with each predicted command to determine whether one or more of the predicted commands are sequential to the received command.

For example, the assignment system 180 analyzes the starting LBA of each predicted command and an amount of data (e.g., a transfer length) associated with each predicted command. The assignment system 180 will then determine whether any of the predicted commands (or whether data associated with any of the predicted commands) is sequential to the command (or is sequential to the data associated with the command) that was received from the host device 105.

Based on the determination, the assignment system 180 determines whether the received command will be written to the first sequential stream or the second sequential stream. The assignment system 180 also determines and/or updates a stream counter associated with each sequential stream. The stream counter indicates an amount of sequential data that is yet to be written to a particular sequential stream. In an example, the stream counter is updated each time a received command is executed and/or each time a new predicted command is received/determined. As additional commands are received, the controller 150 determines whether the additional command is to be written to a sequential stream and also determines, based on the stream counter, on which stream the data associated with the additional command is written.

The assignment system 180 may also determine whether a received command is equivalent to a predicted command. For example, when a command is received from the host device 105, the assignment system 180 may compare one or more command characteristics associated with the received command with one or more command characteristics of a command that was predicted to be received.

If the command characteristics are equivalent, the command is executed, and the stream counters are updated, based on the examples described herein. However, if the command characteristics are not equivalent, the stream counters may be reset and a new set of predicted commands may be determined by the prediction system 185 and provided to the assignment system 180.

FIG. 2 illustrates how a controller of a data storage device assigns a received command 210 to a particular sequential stream based, at least in part, on a set of predicted commands according to an example. In an example, the controller and the data storage device may be similar to the controller 150 and the data storage device 110 shown and described with respect to FIG. 1.

In the examples shown and described with respect to FIG. 2-FIG. 6, three different sets of sequential commands are illustrated. A first set of sequential commands (e.g., Command 1, Command 4, Command 7, Command 9, Command 10, and Command 11) are shown in bold lettering, a second set of sequential commands (e.g., Command 2, Command 5 and Command 8) are shown in bold and italic lettering, and a third set of sequential commands (e.g., Command 3 and Command 6) and shown in bold, italic and underline lettering.

Additionally, in the following examples, Command 1 200 (indicated by the arrow) is the first command that is received by the controller, firmware and/or an assignment system of the data storage device. When the first command is received and/or executed, a set of ten commands is predicted and/or provided to the controller. Each time a subsequent command is received and/or executed, a new command is predicted. For example, when Command 2 is received and/or executed, the controller and/or a prediction system associated with the controller may predict a new command (e.g., Command 12) and add it to the bottom of the list. However, for purposes of explanation, additional predicted commands (e.g., Command 12) are not included in the figures.

In an example, when Command 1 200 is received by the controller, the controller determines one or more command characteristics associated with Command 1 200. The command characteristics include, but are not limited to, a start LBA 220 and a command length 230. The command length 230 indicates an amount of data (or a transfer length) associated with the received command 210. In this example, the start LBA 220 of Command 1 200 is 0x20000 and the command length 230 is 0x4000.

The controller may also determine, based at least in part, on the command length 230 of Command 1 200, whether the data associated with Command 1 200 will exceed a first threshold and a second threshold. In an example, if it is predicted or determined that data associated with a received command will pass a first threshold but not a second threshold, the data may be written to random memory blocks instead of a sequential stream. If it is predicted or determined that data associated with the received command will exceed the first threshold and the second threshold, the data will be written to a sequential stream. However, even if the command length 230 of a received command does not exceed the second threshold, if the combined command length of sequential commands exceeds the second threshold, data associated with the received command will be written to a sequential stream.

The controller, or the prediction system associated with the controller, may also predict N number of commands that will be issued by the host device. In the example shown in FIG. 2, the predicted commands are Command 2-Command 11. Although Command 2-Command 11 are indicated as predicted commands, it is also contemplated that Command 1 200 may be a predicted command. Additionally, although ten predicted commands are shown, the controller and/or the prediction system may predict any number of commands.

In an example, when N commands have been predicted, the controller analyzes one or more command characteristics associated with each predicted command to determine whether any of the predicted commands are sequential to Command 1 200. In this example, and as previously mentioned, the controller determines that Command 4, Command 7, Command 9, Command 10, and Command 11 are all sequential to Command 1 200.

For example, the start LBA 220 associated with Command 1 200 is 0x20000 and the command length 230 is 0x4000. Because the start LBA 220 of Command 1 200, plus the transfer length 230 of Command 1 200, is equivalent to the start LBA 220 of Command 4 (e.g., the start LBA 220 of Command 4 is 0x24000; and 0x20000+0x4000=0x24000), the controller determines that Command 4 is sequential to Command 1 200.

This process is repeated and the controller determines that Command 7, Command 9, Command 10, and Command 11 are also sequential to Command 1 200. The controller also determines a total command length for each sequential command in the set of sequential commands. In this example, the command length 230 for each of Command 1

200, Command 4, Command 7, Command 9, Command 10, and Command 11 is 0x4000. Thus, the total command length for the set of sequential commands is 0x18000.

Because the command length 230 of Command 1 200 exceeds the first threshold and the second threshold (and/or because the total command length of the commands that are sequential to Command 1 200 exceeds the first threshold and the second threshold), the controller assigns Command 1 200 to a particular stream 240 and updates a stream counter 250 associated with the stream. In this example, Stream 0 is the stream 240 that is opened for Command 1 200 and the stream counter 250 (e.g., Stream 0 Counter) associated with Stream 0 is updated to 0x18000.

Command 1 200 is then executed and the Stream 0 Counter is updated (e.g., reduced) based on the command length 230 of Command 1 200. For example, because the command length 230 of Command 1 200 is 0x4000, the value of Stream 0 Counter is 0x14000. In an example, when Command 1 200 is executed, a new command is predicted.

When the new command is predicted, the controller determines whether the new command will be sequential to Command 1 200. If the new command is sequential to Command 1 200, the controller will also increment Stream 0 Counter based on the predicted command length 230 of the new command. However, if the controller determines the new command is not sequential to Command 1 200, the Stream 0 Counter is not incremented.

Although Stream 0 was opened for, and associated with Command 1 200, in an example a first threshold amount of data (e.g., 0x40 sectors) may be written to a random stream. Because additional data remains to be written, a second threshold amount of data (e.g., 0x1FC0) may be written to an intermediate stream. As there is still additional data to be written, the remaining data (e.g., 0x2000) is written to Stream 0.

In an example, the use of two (or more) thresholds prevents unnecessarily opening and closing of sequential streams. For example, a sequential stream may not need to be opened for every command that crosses the first threshold. As such and in some examples, two (or more) thresholds may need to be crossed or exceeded before writes to a sequential stream may occur. However, based on the predicted commands, the controller determines whether sequential commands associated with the current command (e.g., Command 1 200) will cross the second threshold. If the amount of data associated with the sequential commands will cross the threshold, the stream is opened.

FIG. 3 illustrates an example in which the controller assigns a received command 210 to a sequential stream 240 and updates a stream counter 250 associated with the sequential stream 240 when a new command is received according to an example.

In the example shown in FIG. 3, Command 2 300 is received by the controller. When Command 2 300 is received, the controller and/or firmware associated with the controller determines whether Command 2 300 is the same command that was predicted. If the commands are similar, the process proceeds. However, if the commands are different, the stream counters 250 are reset a new set of commands are predicted. However, in the examples that follow, the controller and/or the prediction system correctly predicted the remaining commands.

When Command 2 300 is received, the controller analyzes the start LBA 220 and the command length 230 of the received command 210. In this example, the start LBA 220 of Command 2 300 is 0x0. As such, the controller determines that Command 2 300 is not sequential to Command 1.

The controller may also determine, based on the command length 230 (e.g., 0x2000) of Command 2 300, that the data will cross the first threshold, but not the second threshold. As such, a sequential stream should not be opened for Command 2 300.

However, the controller may also determine that Command 5 and Command 8 are sequential to Command 2 300. Additionally, and based on the command length 230 of Command 5 and Command 8 (e.g., each sequential command has a write length of 0x2000 for a total of 0x4000), the controller may determine that this set of sequential commands will exceed both the first and second thresholds. As such, the controller may open a sequential stream to Command 2 300.

The controller may then compare the stream counter 250 associated with each sequential stream to determine which sequential stream should be opened and/or associated with Command 2 300. In this example, the stream counter 250 for Stream 0 is 0x14000 and the stream counter 250 for Stream 1 is 0x0. In an example, the controller selects the stream with the lowest stream counter 250. In examples in which the stream counters 250 are equivalent, the controller selects the stream with the least amount of sequential data (e.g., the least amount written and/or the least amount predicted). For example, if the stream counter 250 for Stream 0 and Stream 1 is 0x4000, but Stream 0 has 1 GB of sequential data and Stream 1 has 600 KB of sequential data, the controller would select Stream 1 for closure (if necessary) and subsequent opening.

In this example, because the stream counter 250 associated with Stream 1 is lower than the stream counter 250 associated with Stream 0, the controller selects the Stream 1 and opens Stream 1 to Command 2 300. The controller will also update the stream counter 250 for Stream 1.

In this example, the stream counter 250 for Stream 1 is set to 0x4000 (e.g., the command length 230 associated with Command 5 and Command 8). When Command 2 300 is executed, the controller updates the stream counter 250 associated with Stream 1 based on the command length 230 of the current command (e.g., Command 2 300). However, because the command length 230 of Command 2 300 did not exceed both thresholds (and was therefore not included in the stream counter 250 calculation of Stream 1), the stream counter 250 of Stream 1 remains at 0x4000.

Figure 4:
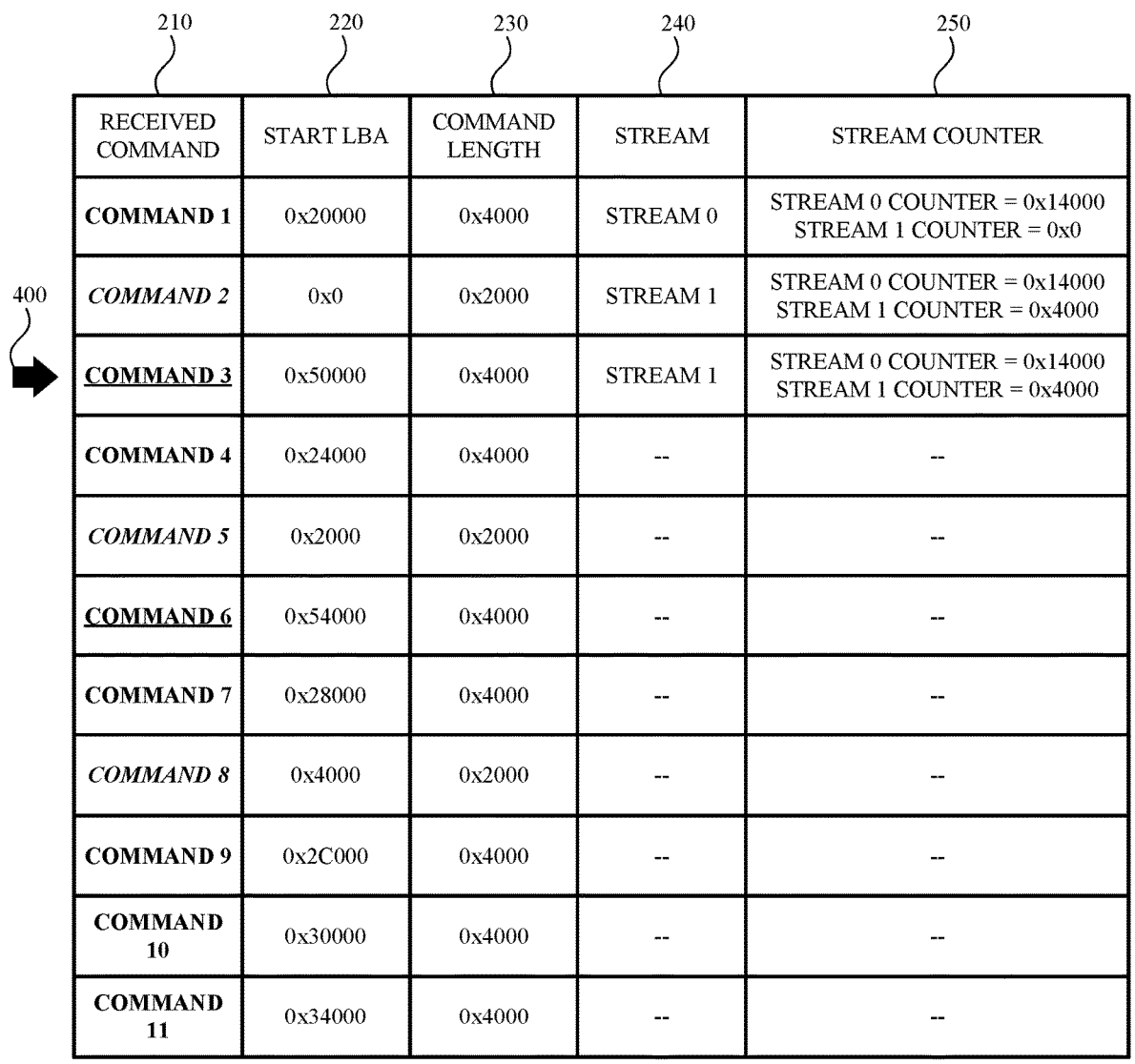
FIG. 4 illustrates another example in which the controller assigns a received command to a sequential stream and updates the stream counter associated with the sequential stream when a new command is received according to an example.

FIG. 4 illustrates another example in which the controller assigns a received command 210 to a sequential stream and updates the stream counter 250 associated with the sequential stream when a new command is received according to an example.

In the example shown in FIG. 4, Command 3 400 is received by the controller of the data storage device. When Command 3 400 is received, the controller analyzes the start LBA 220 of the command and the command length 230 of the command. In this example, the start LBA 220 of Command 3 400 is 0x50000. As such, the controller determines that Command 3 400 is not sequential to either Command 1 or Command 2. The controller may also determine, based on the command length (e.g., 0x4000) of Command 3 400, that the data will cross the first threshold and the second threshold. As such, a sequential stream should be opened for Command 3 400.

In addition, the controller may determine that Command 6 is sequential to Command 3 400. Based on the command length 230 of Command 6 (e.g., Command 6 has a command length 230 of 0x4000), the controller confirms that this set of sequential commands will exceed both the first and second thresholds. As such, the controller confirms its earlier determination to open a sequential stream to Command 3 400.

However, in this example, Stream 0 and Stream 1 are both busy (e.g., Stream 0 is associated with Command 1 and Stream 1 is associated with Command 2). As such, one of the streams will need to be closed and subsequently opened for Command 3 400. To determine which stream to close, the controller compares the stream counter 250 associated with each stream. The stream with the lowest value (e.g., the stream with the least amount of sequential data to write) will be the stream that is closed.

In this example, the stream counter 250 for Stream 0 is 0x14000 and the stream counter 250 for Stream 1 is 0x4000. As such, the controller will close Stream 1 with respect to Command 2, open Stream 1 with respect to Command 3 400 and update the stream counter 250 for Stream 1.

In this example, the stream counter 250 for Stream 1 is initially set to 0x8000 (e.g., the command length 230 associated with Command 3 and Command 6). However, when Command 3 400 is executed, the controller updates the stream counter 250 associated with Stream 1 based on the command length 230 of the current command (e.g., Command 2 300). Thus, the stream counter 250 of Stream 1 is 0x4000.

Figure 5:
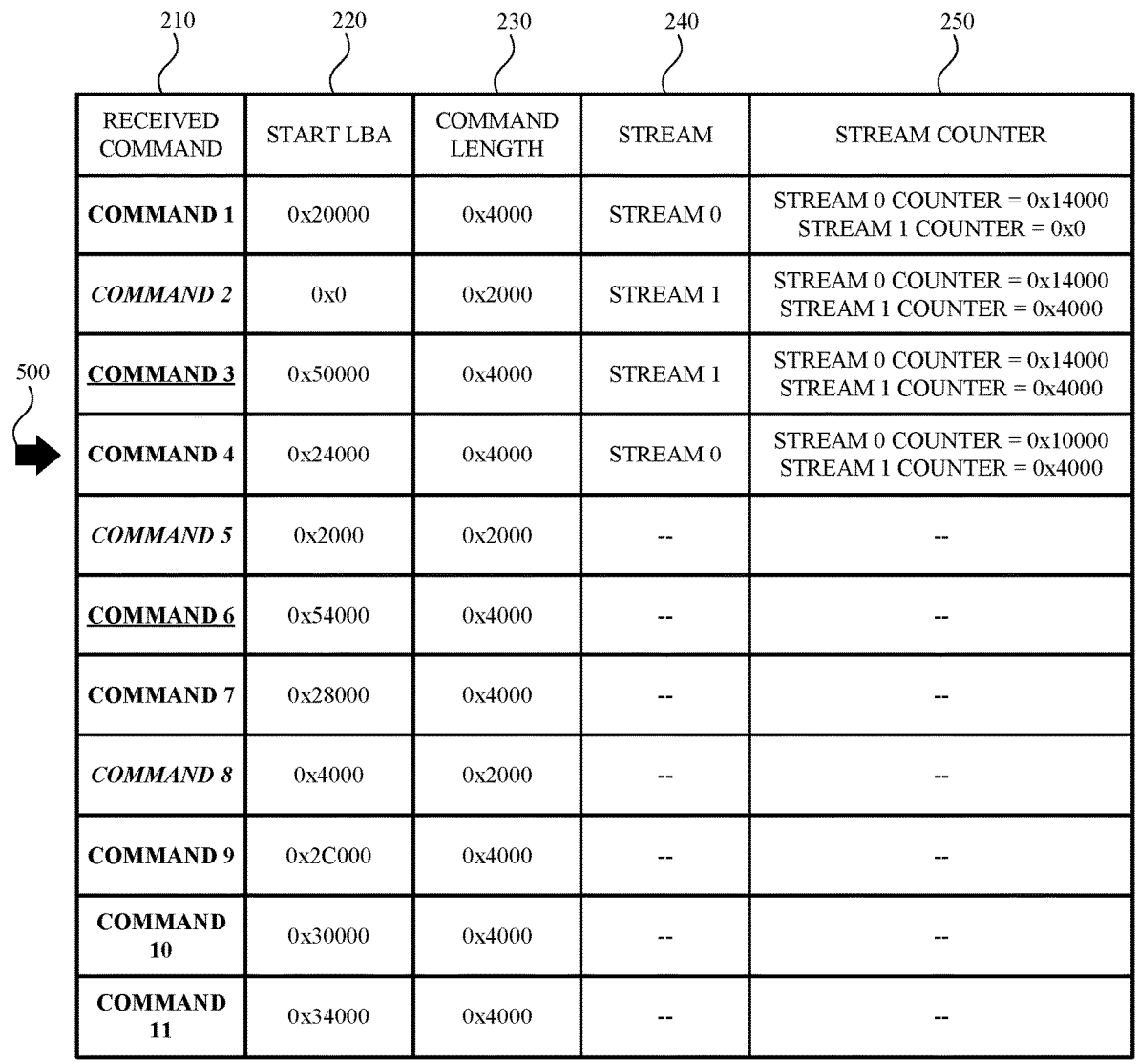
FIG. 5 illustrates how the controller updates a stream counter associated with a sequential stream when a sequential command is received according to an example.

FIG. 5 illustrates how the controller updates a stream counter 250 associated with a sequential stream when a sequential command is received according to an example. In the example shown in FIG. 5, the sequential command is Command 4 500. As with previous examples, when Command 4 500 is received by the controller, the controller analyzes the start LBA 220 and the command length 230 of the command. In this example, the start LBA 220 of Command 4 500 is 0x24000. As such, the controller determines that Command 4 500 is sequential to Command 1. Based on this determination, the controller causes the data associated with Command 4 500 to be written to Stream 0. Once Command 4 500 has been executed, the stream counter 250 associated with Stream 0 is updated to 0x10000. In an example, the update may be made by decrementing the command length 230 associated with the executed command or by determining the total command lengths 230 of each sequential command, including any new predicted commands that may be sequential to Command 1.

FIG. 6 illustrates how the controller continues to assign various commands to various sequential streams and how stream counters 250 associated with the various sequential streams are updated according to an example. In the examples described with respect to FIG. 6, various commands (e.g., Command 5 through Command 11 600) are received and executed. As previously explained, as each command is received and executed, various streams may be opened and closed and stream counters 250 associated with each sequential stream are updated.

For example, when Command 5 is received, the controller determines, based on the start LBA 220 that Command 5 is not sequential to Command 4 or Command 3. The controller also determines, based on the command length 250 of predicted sequential commands (e.g., Command 8), that Command 5 should have access to a sequential stream.

In this example, the command length 230 of Command 5 may indicate that by itself, Command 5 may not need access to a sequential stream (e.g., the data associated with Command 5 may cross the first threshold, but not the second threshold). However, when the command lengths of each sequential commands are combined, the combined command lengths may exceed the second threshold. As such, Command 5 should be granted access to a sequential stream.

However, in this example, Stream 0 and Stream 1 are both busy (e.g., Stream 0 is associated with Command 4 and Stream 1 is associated with Command 3). As such, one of the streams will need to be closed and subsequently opened for Command 5. To determine which stream to close, the controller compares the stream counter 250 associated with each stream. The stream with the lowest value (e.g., the stream with the least amount of sequential data to write) will be the stream that is closed. As such, Stream 1 is closed and subsequently opened for Command 5.

When Command 5 is executed, the stream counter 250 associated with Stream 1 is updated. In this example, the stream counter 250 for Stream 1 is updated based on the command length 230 of the predicted commands associated with Command 5. For example, the stream counter 250 of Stream 1 is updated to 0x2000, based at least in part, on the command length 230 of Command 8 (e.g., because Command 8 is sequential to Command 5).

When Command 6 is received, the controller determines, based on the start LBA 220 that Command 6 is not sequential to Command 5 or sequential to Command 4. However, the controller may also determine, based on the command length 230, that Command 6 should have access to a sequential stream.

As with previous examples, Stream 0 and Stream 1 are both busy (e.g., Stream 0 is associated with Command 4 and Stream 1 is associated with Command 5). As such, one of the streams will need to be closed and subsequently opened for Command 6. As previously explained, the controller compares the stream counter 250 of Stream 0 to the stream counter 250 of Stream 1. Based on the comparison, the controller closes Stream 1 because Stream 1 has the lowest value. Once Stream 1 has been closed, the controller subsequently opens Stream 1 for Command 6.

When Command 6 is executed, the stream counter 250 for Stream 1 is updated. In this example, because there are no sequential commands associated with Command 6, the stream counter 250 for Stream 1 is set to 0x0.

When Command 7 is received, the controller determines Command 7 is sequential to Command 4. As such, data associated with Command 7 is written to Stream 0 and the stream counter 250 associated with Stream 0 is updated to 0xC000 (e.g., based on predicted Command 9, Command 10 and Command 11).

When Command 8 is received, the controller may determine, based on the start LBA 220 that Command 8 is not sequential to Command 6 or Command 7. The controller may also determine, based on the command length 230, that Command 8 does not need access to a sequential stream as the data associated with Command 8 will not exceed both thresholds. As such, data associated with Command 8 will be written to random memory blocks and not a sequential stream.

When Command 9, Command 10 and Command 11 600 are received, the controller determines that these commands are sequential to Command 7. As such, the data associated with these commands is routed to Stream 0. The stream counter 250 associated with Stream 0 is updated after each command is executed such as previously described. As shown in FIG. 6, when Command 11 600 is executed, the stream counter 250 associated with Stream 0 is 0x0 as there are no more sequential commands associated with Stream 0.

In an example, each stream counter 250 is updated based on predicted commands. For example, the stream counter 250 for each stream may be reduced based on a command length 230 of commands that are executed. In another example, the stream counter 250 for each stream may be incremented based on a command length 230 of a next set of predicted sequential commands.

As previously indicated, in some examples, each time a command is executed, a new command is predicted. As such, the stream counter 250 for each stream may be updated based on a rolling window of predicted commands and the sequentiality of predicted commands to current commands will be taken into account before closing/opening any sequential streams. As such, there will be minimum mixing of data across different streams and the stream with maximum sequential data will be given priority.

Figure 7:
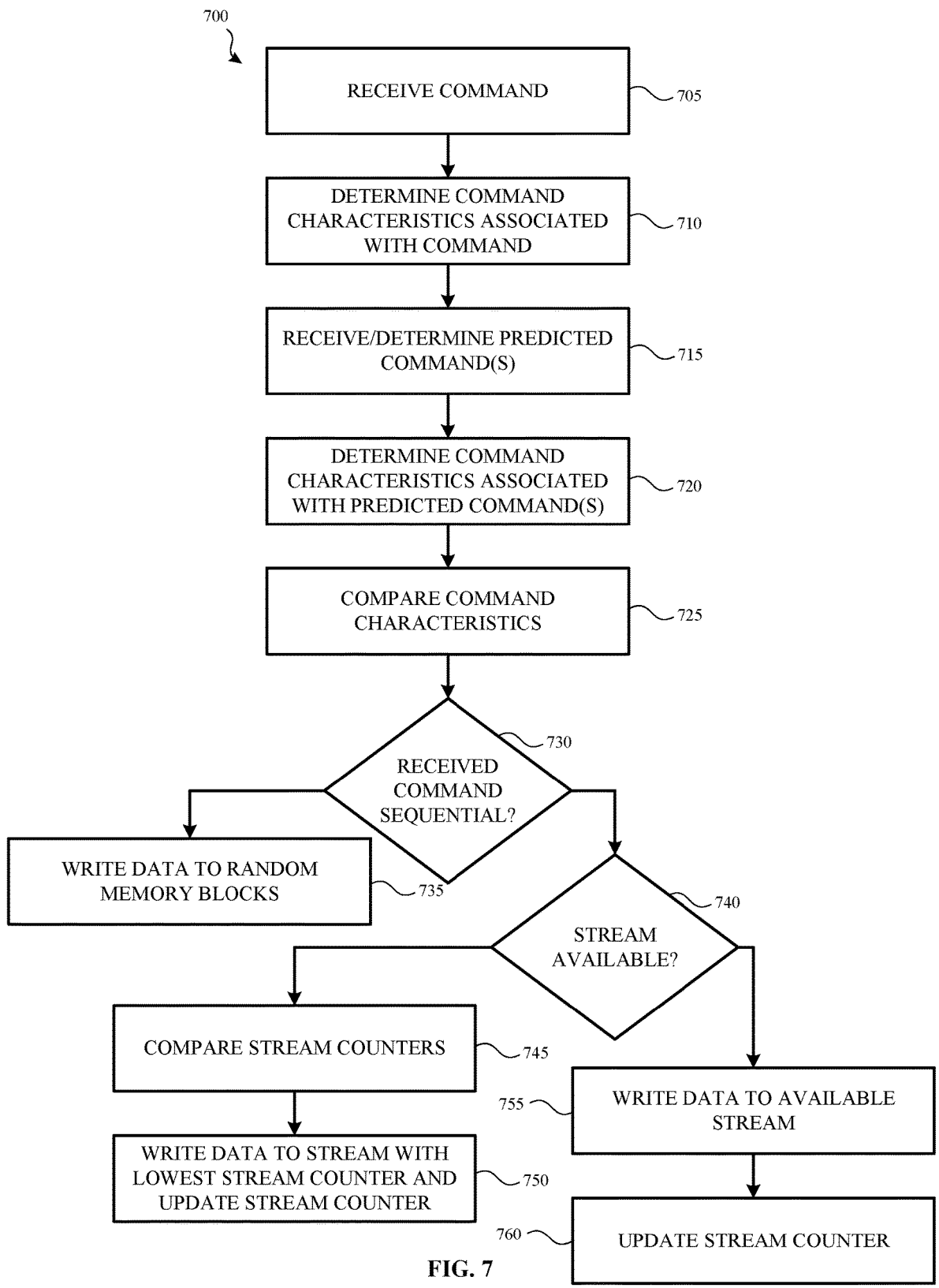
FIG. 7 illustrates a method for writing data to a data storage device according to an example.

FIG. 7 illustrates a method 700 for writing data to a data storage device according to an example. In an example, the method 700 may be performed by a controller of a data storage device, such as, for example, the controller 150 of the data storage device 110 shown and described with respect to FIG. 1.

Method 700 begins when a command is received (705). In an example, the command is issued from a host device and received by a controller and/or firmware of a data storage device associated with the host device.

When the command is received, the controller may analyze the command to determine (710) one or more command characteristics associated with the command. In an example, the one or more command characteristics include a starting LBA associated with the command and a transfer length associated with the command. Although specific command characteristics are mentioned, other command characteristics may be used or determined. In an example, the received command was a previously predicted command. As such, the command characteristics of the received command may have been predicted and subsequently verified by the controller.

The controller may also receive and/or determine (715) one or more predicted commands. The predicted commands are upcoming commands that the controller and/or a prediction system associated with the controller, predicts will be issued by the host device. In an example, N number of commands may be predicted and/or received.

When the predicted commands are received, the controller analyzes the predicted commands to determine (720) command characteristics associated with the predicted commands. In an example, the command characteristics of the predicted commands are similar to the command characteristics of the received command.

In an example, the controller also compares (725) the command characteristics of the received command to command characteristics of the predicted commands. The comparison is used to determine whether one or more of the predicted commands is sequential to the received command. It is also contemplated that a determination may be made as to whether the received command is sequential to a previously received and/or previously predicted command that has already been executed.

Based on the comparison, the controller determines (730) whether any of the predicted commands are sequential to the received command. In an example, the determination is based, at least in part, on the command characteristics associated with the received command and on the command characteristics associated with the predicted commands.

If it is determined (730) that the data associated with the received command is not sequential to a previously received command and/or if it is determined that one or more predicted commands are not sequential with the received command, the data associated with the received command is written (735) to random memory blocks of the data storage device. In some examples, a determination may also be made as to whether data associated with the received command, either alone or in combination with data associated with one or more predicted sequential commands, will exceed one or more thresholds. If it is determined that the data associated with the received command will not exceed one or more thresholds, the data associated with the command may be written (735) to random memory blocks of the data storage device.

However, if it is determined (730) that the data associated with the received command is sequential to a previously received command and/or if it is determined that one or more of the predicted commands is sequential to the received command (and the amount of data associated with received command, either alone or in combination with the amount of data associated with the one or more predicted commands exceeds one or more thresholds), the controller determines (740) whether a stream is available.

In an example a stream is available if a counter associated with the stream is zero (e.g., 0x0). In another example, the stream is available if the received command is sequential to a previously received command and the stream is currently associated with the previously received command.

If the controller determines (740) the stream is available, data associated with the command is written to the available stream and a counter associated with the stream is updated (760). However, if the controller determines (740) that a stream is not available, the controller compares (745) stream counters associated with each stream. The controller may then close the stream with the lowest stream counter and subsequently open the stream for the received command. The controller then causes data associated with the received command to be written (750) to the newly opened stream. The controller also updates the stream counter associated with the newly opened stream.

Figure 8:
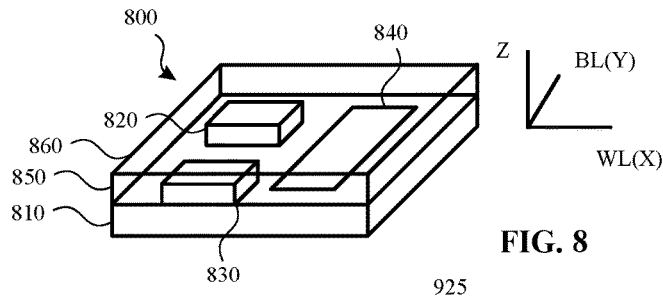
FIG. 8 is a perspective view of a storage device that includes three-dimensional (3D) stacked non-volatile memory according to an example.
Figure 9:
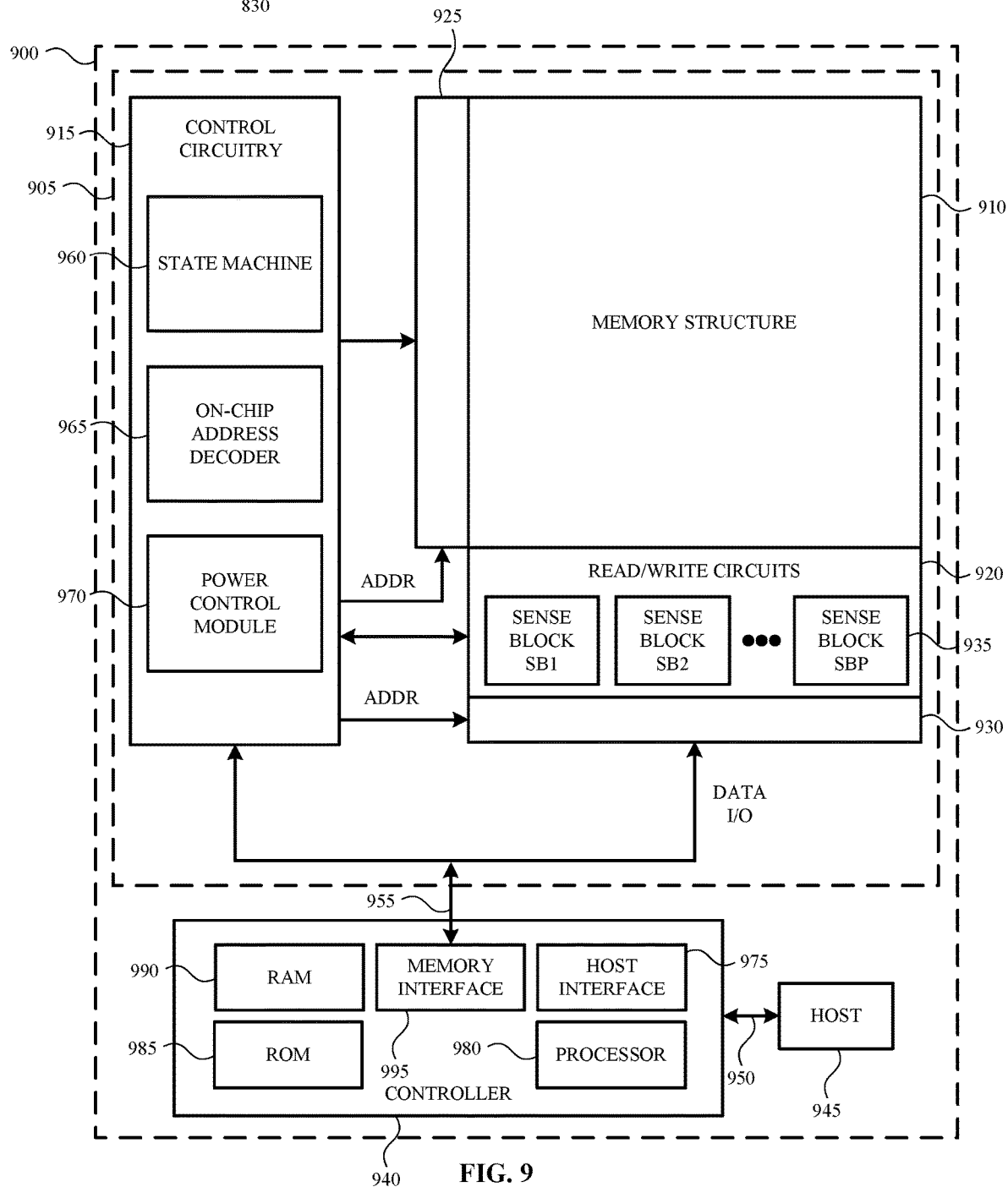
FIG. 9 is a block diagram of a data storage device according to an example.

FIG. 8-FIG. 9 describe example storage devices that may be used with or otherwise implement the various features described herein. For example, the storage devices shown and described with respect to FIG. 8-FIG. 9 may include various systems and components that are similar to the systems and components shown and described with respect to FIG. 1. For example, the controller 922 shown and described with respect to FIG. 9 may be similar to the controller 150 of FIG. 1. Likewise, the memory dies 908 may be similar to the first memory die 165 and/or the second memory die 170 of FIG. 1.

FIG. 8 is a perspective view of a storage device 800 that includes three-dimensional (3D) stacked non-volatile memory according to an example. In this example, the storage device 800 includes a substrate 810. Blocks of memory cells are included on or above the substrate 810. The blocks may include a first block 820 (BLK0) and a second block 830 (BLK1). Each block may be formed of memory cells (e.g., non-volatile memory elements). The substrate 810 may also include a peripheral area 840 having support circuits that are used by the first block 820 and the second block 830. The peripheral area 840 may be located beneath the first block 820 and the second block 830. In another example, the peripheral area may be included on a different substrate or die.

The substrate 810 may also carry circuits under the blocks, along with one or more lower metal layers which are patterned in conductive paths to carry signals from the circuits. The blocks may be formed in an intermediate region 850 of the storage device 800. The storage device may also include an upper region 860. The upper region 860 may include one or more upper metal layers that are patterned in conductive paths to carry signals from the circuits. Each block of memory cells may include a stacked area of memory cells. In an example, alternating levels of the stack represent wordlines. While two blocks are depicted, additional blocks may be used and extend in the x-direction and/or the y-direction.

In an example, a length of a plane of the substrate 810 in the x-direction represents a direction in which signal paths for wordlines or control gate lines extend (e.g., a wordline or drain-end select gate (SGD) line direction) and the width of the plane of the substrate 810 in the y-direction represents a direction in which signal paths for bit lines extend (e.g., a bit line direction). The z-direction represents a height of the storage device 800.

FIG. 9 is a functional block diagram of a storage device 900 according to an example. In an example, the storage device 900 may be the 3D stacked non-volatile storage device 800 shown and described with respect to FIG. 8. The components depicted in FIG. 9 may be electrical circuits. In an example, the storage device 900 includes one or more memory dies 905. Each memory die 905 includes a three-dimensional memory structure 910 of memory cells (e.g., a 3D array of memory cells), control circuitry 915, and read/write circuits 920. In another example, a two-dimensional array of memory cells may be used. The memory structure 910 is addressable by wordlines using a first decoder 925 (e.g., a row decoder) and by bit lines using a second decoder 930 (e.g., a column decoder). The read/write circuits 920 may also include multiple sense blocks 935 including SB1, SB2, . . . , SBp (e.g., sensing circuitry) which allow pages of the memory cells to be read or programmed in parallel. The sense blocks 935 may include bit line drivers.

In an example, a controller 940 is included in the same storage device 900 as the one or more memory dies 905. In another example, the controller 940 is formed on a die that is bonded to a memory die 905, in which case each memory die 905 may have its own controller 940. In yet another example, a controller die controls all of the memory dies 905.

Commands and data may be transferred between a host 945 and the controller 940 using a data bus 950. Commands and data may also be transferred between the controller 940 and one or more of the memory dies 905 by way of lines 955. In one example, the memory die 905 includes a set of input and/or output (I/O) pins that connect to lines 955.

The memory structure 910 may also include one or more arrays of memory cells. The memory cells may be arranged in a three-dimensional array or a two-dimensional array. The memory structure 910 may include any type of non-volatile memory that is formed on one or more physical levels of arrays of memory cells having an active area disposed above a silicon substrate. The memory structure 910 may be in a non-volatile memory device having circuitry associated with the operation of the memory cells, whether the associated circuitry is above or within the substrate.

The control circuitry 915 works in conjunction with the read/write circuits 920 to perform memory operations (e.g., erase, program, read, and others) on the memory structure 910. The control circuitry 915 may include registers, ROM fuses, and other devices for storing default values such as base voltages and other parameters.

The control circuitry 915 may also include a state machine 960, an on-chip address decoder 965, and a power control module 970. The state machine 960 may provide chip-level control of various memory operations. The state machine 960 may be programmable by software. In another example, the state machine 960 does not use software and is completely implemented in hardware (e.g., electrical circuits).

The on-chip address decoder 965 may provide an address interface between addresses used by host 945 and/or the controller 940 to a hardware address used by the first decoder 925 and the second decoder 930.

The power control module 970 may control power and voltages that are supplied to the wordlines and bit lines during memory operations. The power control module 970 may include drivers for wordline layers in a 3D configuration, select transistors (e.g., SGS and SGD transistors) and source lines. The power control module 970 may include one or more charge pumps for creating voltages.

The control circuitry 915, the state machine 960, the on-chip address decoder 965, the first decoder 925, the second decoder 930, the power control module 970, the sense blocks 935, the read/write circuits 920, and/or the controller 940 may be considered one or more control circuits and/or a managing circuit that perform some or all of the operations described herein.

In an example, the controller 940, is an electrical circuit that may be on-chip or off-chip. Additionally, the controller 940 may include one or more processors 980, ROM 985, RAM 990, memory interface 995, and host interface 975, all of which may be interconnected. In an example, the one or more processors 980 is one example of a control circuit. Other examples can use state machines or other custom circuits designed to perform one or more functions. Devices such as ROM 985 and RAM 990 may include code such as a set of instructions. One or more of the processors 980 may be operable to execute the set of instructions to provide some or all of the functionality described herein.

Alternatively or additionally, one or more of the processors 980 may access code from a memory device in the memory structure 910, such as a reserved area of memory cells connected to one or more wordlines. The memory interface 995, in communication with ROM 985, RAM 990, and one or more of the processors 980, may be an electrical circuit that provides an electrical interface between the controller 940 and the memory die 905. For example, the memory interface 995 may change the format or timing of signals, provide a buffer, isolate from surges, latch I/O, and so forth.

The one or more processors 980 may issue commands to control circuitry 915, or any other component of memory die 905, using the memory interface 995. The host interface 975, in communication with the ROM 985, the RAM 995, and the one or more processors 980, may be an electrical circuit that provides an electrical interface between the controller 940 and the host 945. For example, the host interface 975 may change the format or timing of signals, provide a buffer, isolate from surges, latch I/O, and so on. Commands and data from the host 945 are received by the controller 940 by way of the host interface 975. Data sent to the host 945 may be transmitted using the data bus 950.

Multiple memory elements in the memory structure 910 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a RAM configuration.

One or more examples describe a method, comprising: receiving a command from a host device; determining one or more command characteristics associated with the received command; predicting a set of upcoming commands from the host device; determining based, at least in part, on one or more command characteristics associated with the set of upcoming commands and on the one or more command characteristics associated with the received command, whether one or more commands of the set of upcoming commands is sequential to the received command; and based, at least in part, on determining the one or more commands of the set of upcoming commands is sequential to the received command: associating a sequential stream with the received command; and determining a counter for the sequential stream, the counter indicating an amount of data associated with the one or more commands of the set of upcoming commands that is sequential to the received command. In an example, the one or more command characteristics include one or more of a logical block address associated with a command and an amount of data associated with the command. In an example, the method also includes executing the received command on the sequential stream. In an example, the received command is a first command and wherein the method further comprises: receiving a second command from the host device, the second command being part of the set of predicted upcoming commands from the host device; determining one or more command characteristics associated with the second command; and determining based, at least in part, on one or more command characteristics associated with the second command, whether the second command is sequential to the first command. In an example, the method also includes associating the second command with the sequential stream based, at least in part, on determining the second command is sequential to the first command; executing the command on the sequential stream; and updating the counter associated with the sequential stream. In an example, the method also includes analyzing the set of upcoming commands from the host device based, at least in part, on determining the second command is not sequential to the first command; determining based, at least in part, on the one or more command characteristics associated with the set of upcoming commands and on the one or more command characteristics associated with the second command, whether one or more commands of the set of upcoming commands is sequential to the second command; and based, at least in part, on determining the one or more commands of the set of upcoming commands is sequential to the second command: comparing the counter associated the sequential stream to another counter associated with another sequential stream; and associating the second command with the sequential stream or the another sequential stream based, at least in part, on the comparison. In an example, the second command is associated with the sequential stream based, at least in part, on determining the counter associated with the sequential stream is less than the another counter associated with the another sequential stream. In an example, the method also includes updating the counter associated with the sequential stream based, at least in part, on the one or more command characteristics associated with the set of upcoming commands and on the one or more command characteristics associated with the second command; and executing the second command on the sequential stream.

Other examples describe a data storage device, comprising: a controller; and a memory communicatively coupled to the controller and storing instructions that, when executed by the controller, perform operations, comprising: receiving a command from a host device; determining one or more command characteristics associated with the received command; analyzing a set of predicted commands from the host device; determining based, at least in part, on one or more command characteristics associated with the set of predicted commands and on the one or more command characteristics associated with the received command, whether one or more commands of the set of predicted commands is sequential to the received command; and based, at least in part, on determining the one or more commands of the set of predicted commands is sequential to the received command: comparing a first counter associated with a first sequential stream to a second counter associated with a second sequential stream, the first counter indicating an amount of data associated with a first set of predicted sequential commands and the second counter indicating an amount of data associated with a second set of predicted sequential commands; and associating the received command with one of the first sequential stream or the second sequential stream based, at least in part, on the comparison. In an example, the one or more command characteristics associated with the received command include one or more of a logical block address associated with the received command and an amount of data associated with the received command. In an example, the instructions also include instructions for determining whether an amount of data associated with the received command exceeds a data size threshold. In an example, the instructions also include instructions for executing the received command on the first sequential stream based, at least in part, on determining the second counter is greater than the first counter. In an example, the instructions also include instructions for updating the first counter. In an example, the first counter is updated based, at least in part, on a determined amount of data associated with the one or more commands of the set of predicted commands that is sequential to the received command. In an example, the instructions also include instructions for updating the set of predicted commands based, at least in part, on executing the received command on the first sequential stream.

Examples also describe a data storage device, comprising: means for receiving a command from a host device; means for determining one or more command characteristics associated with the received command; means for analyzing a set of predicted commands from the host device; means for determining whether one or more commands of the set of predicted commands is sequential to the received command; means for comparing a first counter associated with a first sequential stream to a second counter associated with a second sequential stream, wherein the first counter indicates an amount of data associated with a first set of predicted sequential commands and the second counter indicates an amount of data associated with a second set of predicted sequential commands and wherein the comparison is based, at least in part, on a determination that the one or more commands of the set of predicted commands is sequential to the received command; and means for associating the received command with one of the first sequential stream or the second sequential stream, wherein the received command is associated with one of the first sequential stream or the second sequential stream based, at least in part, on the comparison. In an example, determining whether the one or more commands of the set of predicted commands is sequential to the received command is based, at least in part, on one or more command characteristics associated with the set of predicted commands and on the one or more command characteristics associated with the received command. In an example, the one or more command characteristics associated with the received command include one or more of a logical block address associated with the received command and an amount of data associated with the received command. In an example, the data storage device also includes means for determining whether an amount of data associated with the received command exceeds a data size threshold. In an example, the data storage device also includes means for executing the received command on the first sequential stream based, at least in part, on determining the second counter is greater than the first counter.

One of ordinary skill in the art will recognize that the technology described herein is not limited to a single specific memory structure, but covers many relevant memory structures within the spirit and scope of the technology as described herein and as understood by one of ordinary skill in the art.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
    receiving a first command from a host device;
    determining one or more command characteristics associated with the first command;
    predicting a set of upcoming commands from the host device;
    determining based, at least in part, on one or more command characteristics associated with the set of upcoming commands and on the one or more command characteristics associated with the first command, whether one or more commands of the set of upcoming commands is sequential to the first command;
    based, at least in part, on determining the one or more commands of the set of upcoming commands is sequential to the first command:
        associating a sequential stream with the first command;
        determining a counter for the sequential stream, the counter indicating a total amount of data associated with the one or more commands of the set of upcoming commands that is sequential to the first command; and
        updating the counter for the sequential stream based, at least in part, on the one or more commands of the set of upcoming commands being executed;
    receiving a second command from the host device, the second command being part of the set of upcoming commands from the host device;
    determining one or more command characteristics associated with the second command;
    determining based, at least in part, on one or more command characteristics associated with the second command, whether the second command is sequential to the first command;
    analyzing the set of upcoming commands from the host device based, at least in part, on determining the second command is non-sequential to the first command;
    determining based, at least in part, on the one or more command characteristics associated with the set of upcoming commands and on the one or more command characteristics associated with the second command, whether one or more commands of the set of upcoming commands is sequential to the second command; and
    based, at least in part, on determining the one or more commands of the set of upcoming commands is sequential to the second command:
        comparing the counter associated the sequential stream to another counter associated with another sequential stream; and
        associating the second command with the sequential stream or the another sequential stream based, at least in part, on the comparison.

2. The method of claim 1, wherein the one or more command characteristics include one or more of a logical block address associated with a command and an amount of data associated with the command.

3. The method of claim 1, further comprising executing the first command on the sequential stream.

4. The method of claim 1, further comprising:
    associating the second command with the sequential stream based, at least in part, on determining the second command is sequential to the first command;
    executing the second command on the sequential stream; and
    updating the counter associated with the sequential stream.

5. The method of claim 1, wherein the second command is associated with the sequential stream based, at least in part, on determining the counter associated with the sequential stream is less than the another counter associated with the another sequential stream.

6. The method of claim 5, further comprising:
    updating the counter associated with the sequential stream based, at least in part, on the one or more command characteristics associated with the set of upcoming commands and on the one or more command characteristics associated with the second command; and
    executing the second command on the sequential stream.

7. A data storage device, comprising:
    a controller operable to:
        receive a command from a host device;
        determine one or more command characteristics associated with the received command;
        analyze a set of predicted commands from the host device;
        determine based, at least in part, on one or more command characteristics associated with the set of predicted commands and on the one or more command characteristics associated with the received command, whether one or more commands of the set of predicted commands is sequential to the received command; and
        based, at least in part, on a determination that the one or more commands of the set of predicted commands is sequential to the received command:
            compare a first counter associated with a first sequential stream to a second counter associated with a second sequential stream, the first counter indicating an amount of data associated with a first set of predicted sequential commands and the second counter indicating an amount of data associated with a second set of predicted sequential commands; and
            associate the received command with one of the first sequential stream or the second sequential stream based, at least in part, on the comparison.

8. The data storage device of claim 7, wherein the one or more command characteristics associated with the received command include one or more of a logical block address associated with the received command and an amount of data associated with the received command.

9. The data storage device of claim 7, wherein the controller is further operable to determine whether an amount of data associated with the received command exceeds a data size threshold.

10. The data storage device of claim 7, wherein the controller is further operable to execute the received command on the first sequential stream based, at least in part, on a determination that the second counter is greater than the first counter.

11. The data storage device of claim 10, wherein the controller is further operable to update the first counter.

12. The data storage device of claim 11, wherein the first counter is updated based, at least in part, on a determined amount of data associated with the one or more commands of the set of predicted commands that is sequential to the received command.

13. The data storage device of claim 10, wherein the controller is further operable to update the set of predicted commands based, at least in part, on an execution of the received command on the first sequential stream.

14. A data storage device, comprising:
means for receiving a command from a host device;
means for determining one or more command characteristics associated with the received command;
means for analyzing a set of predicted commands from the host device;
means for determining whether one or more commands of the set of predicted commands is sequential to the received command;
means for comparing a first counter associated with a first sequential stream to a second counter associated with a second sequential stream, wherein the first counter indicates an amount of data associated with a first set of predicted sequential commands and the second counter indicates an amount of data associated with a second set of predicted sequential commands and wherein the comparison is based, at least in part, on a determination that the one or more commands of the set of predicted commands is sequential to the received command; and
means for associating the received command with one of the first sequential stream or the second sequential stream, wherein the received command is associated with one of the first sequential stream or the second sequential stream based, at least in part, on the comparison.

15. The data storage device of claim 14, wherein determining whether the one or more commands of the set of predicted commands is sequential to the received command is based, at least in part, on one or more command characteristics associated with the set of predicted commands and on the one or more command characteristics associated with the received command.

16. The data storage device of claim 15, wherein the one or more command characteristics associated with the received command include one or more of a logical block address associated with the received command and an amount of data associated with the received command.

17. The data storage device of claim 14, further comprising means for determining whether an amount of data associated with the received command exceeds a data size threshold.

18. The data storage device of claim 14, further comprising means for executing the received command on the first sequential stream based, at least in part, on determining the second counter is greater than the first counter.

19. The data storage device of claim 18, further comprising means for updating the first counter.

20. The data storage device of claim 18, further comprising means for updating the set of predicted commands based, at least in part, on executing the received command on the first sequential stream.

* * * * *